United States Patent [19]
Thompson

[11] Patent Number: 5,402,112
[45] Date of Patent: Mar. 28, 1995

[54] LIQUID LEVEL AND TEMPERATURE MONITORING APPARATUS

[76] Inventor: Lee H. Thompson, 4409 St. Charles Rd., Columbia, Mo. 65201

[21] Appl. No.: 111,214

[22] Filed: Aug. 24, 1993

Related U.S. Application Data

[63] Continuation-in-part of Ser. No. 15,628, Feb. 9, 1993, Pat. No. 5,297,393.

[51] Int. Cl.⁶ ............................................. G08B 21/00
[52] U.S. Cl. ..................................... 340/622; 62/129; 137/392; 73/295
[58] Field of Search ............... 340/622; 62/129, 158, 62/475, 85, 195; 73/295

[56] References Cited

U.S. PATENT DOCUMENTS

| | | | |
|---|---|---|---|
| 2,106,756 | 2/1938 | Obermaier | 340/622 X |
| 2,978,691 | 4/1961 | Beher | 340/622 |
| 3,059,443 | 10/1962 | Garner | 62/129 |
| 3,138,023 | 6/1964 | Washburn | 340/622 |
| 3,196,679 | 5/1964 | Howland | 73/295 |
| 3,562,546 | 2/1971 | Kraemer | 307/117 |
| 4,169,357 | 10/1979 | Kelley | 62/126 |
| 4,308,725 | 1/1982 | Chiyoda | 62/129 |
| 4,326,199 | 4/1982 | Tarpley et al. | 340/622 |
| 4,417,451 | 11/1983 | Spauschus | 62/475 X |
| 4,449,403 | 5/1984 | McQueen | 73/295 |
| 4,633,673 | 1/1987 | Morrison et al. | 62/129 |
| 4,844,117 | 7/1989 | Sung | 137/386 |
| 4,856,288 | 8/1989 | Weber | 62/129 |
| 4,967,593 | 11/1990 | McQueen | 73/295 |

*Primary Examiner*—Jeffery A. Hofsass
*Attorney, Agent, or Firm*—Hovey, Williams, Timmons & Collins

[57] ABSTRACT

An apparatus is provided for use in monitoring the level and temperature of a liquid flowing through a horizontally extending line that is to remain full of liquid, wherein the temperature of the liquid is to be maintained below an established acceptable value. The apparatus includes a chamber interposed in the line and formed with an enlarged transverse cross-sectional area, and is disposed at least partially above the line. The chamber is closed except for an inlet and outlet in fluid communication with the line. A sensing assembly is provided within the chamber for sensing the level and temperature of the liquid flowing through the chamber. A control assembly measures the liquid level and temperature sensed by the sensing assembly and activates an alarm when either the level of the liquid in the chamber drops below a predetermined level or the temperature exceeds a predetermined value above the established acceptable value. Structure is also provided within the chamber for relieving trapped air from the chamber so that the trapped air does not force the liquid level below the sensing means.

4 Claims, 4 Drawing Sheets

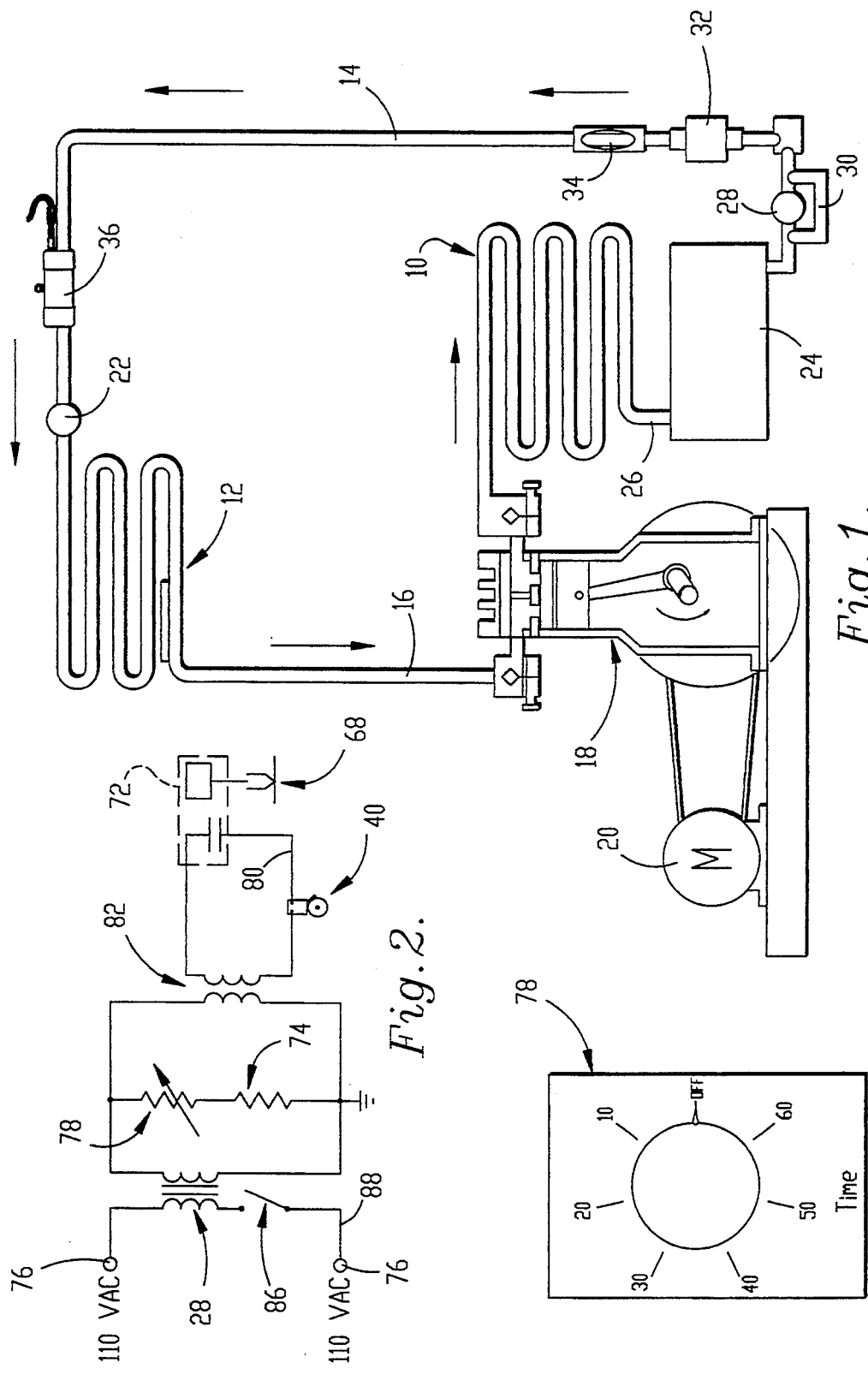

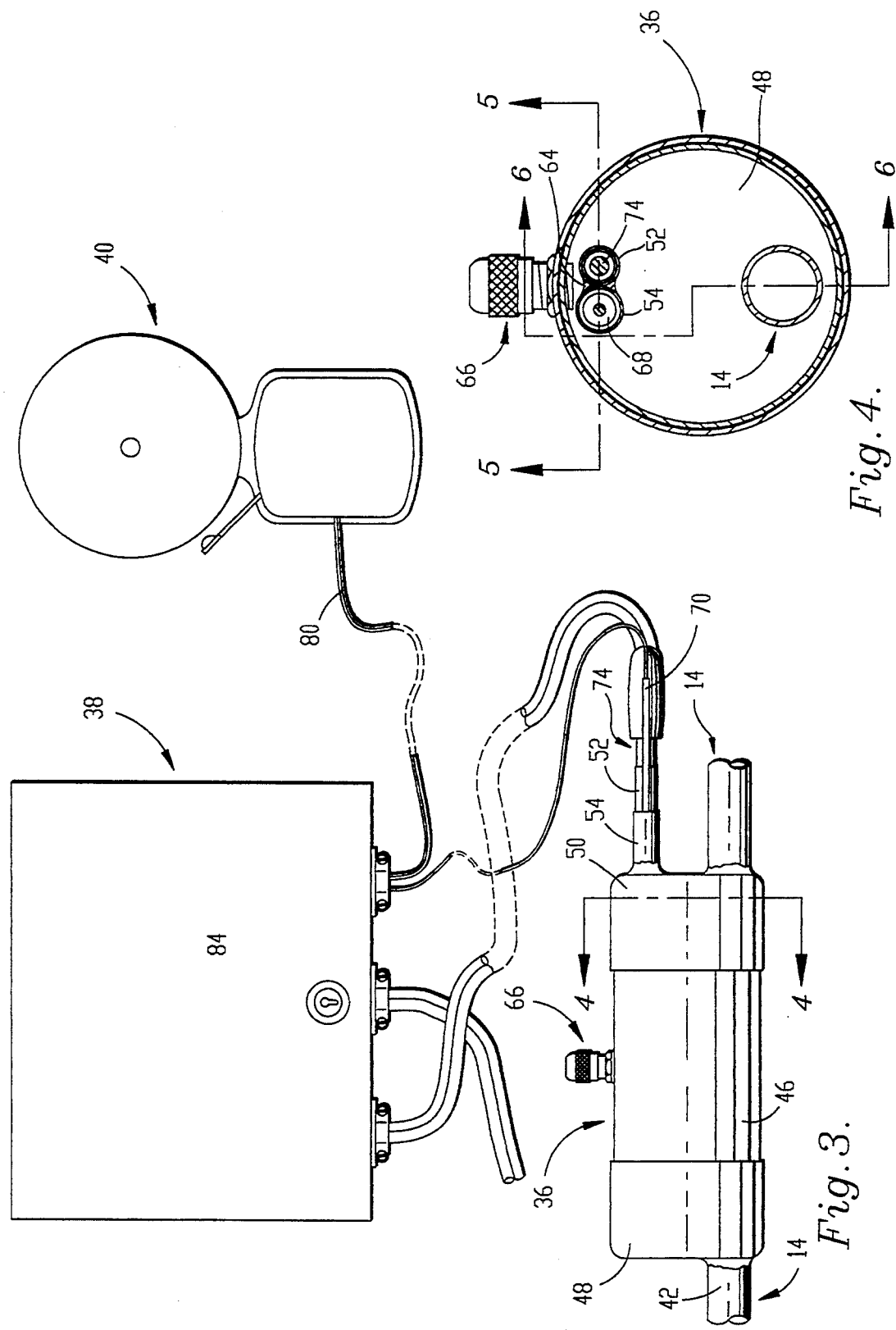

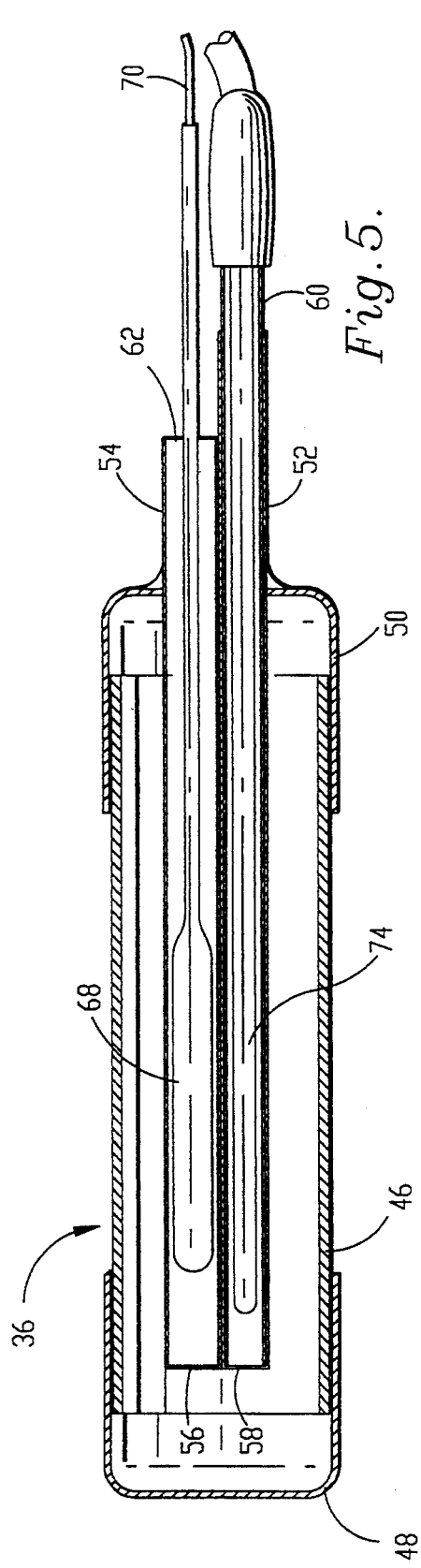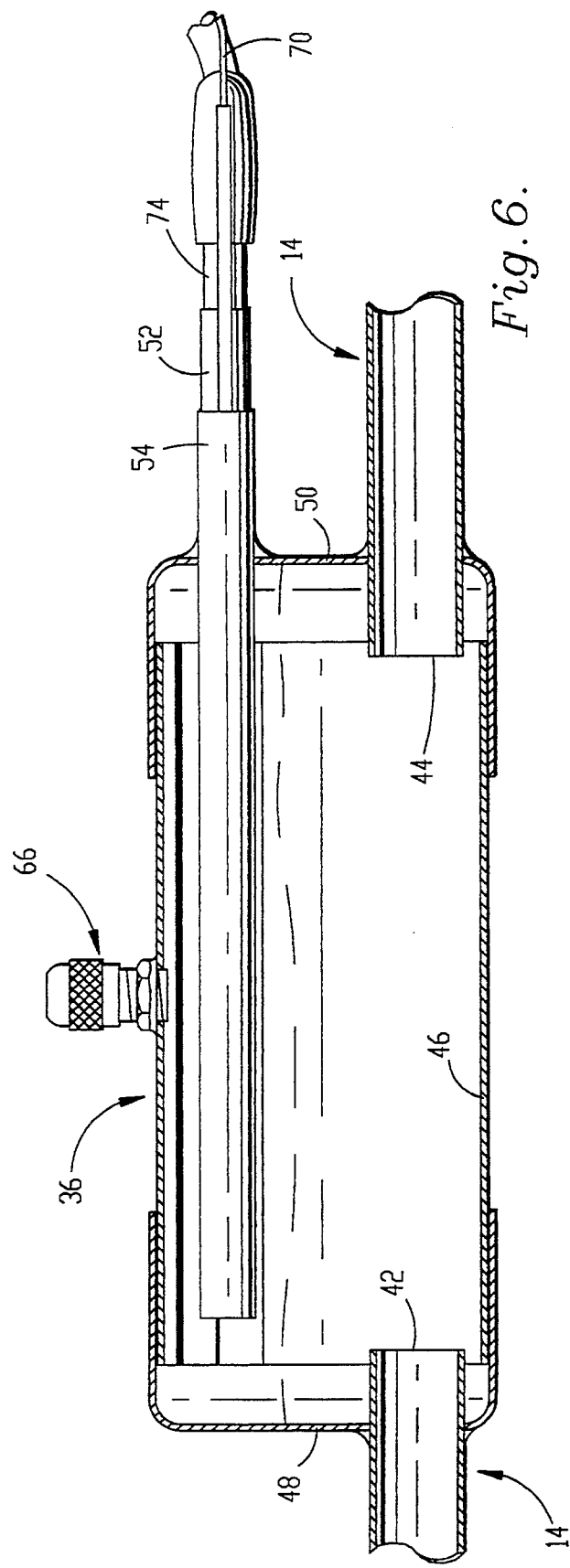

LIQUID LEVEL AND TEMPERATURE MONITORING APPARATUS

RELATED APPLICATIONS

This application is a continuation-in-part of Ser. No. 08/015,628, filed 9 Feb. 1993, by Lee Thompson, and entitled Liquid Level and Temperature Monitoring Apparatus, now U.S. Pat. No. 5,297,393.

BACKGROUND OF THE INVENTION

1. Field of the Invention

The present invention relates generally to devices for monitoring the level and temperature of a liquid flowing through a fluid handling system and, more particularly, to a monitoring apparatus for providing an alarm when the flow or temperature of a liquid within a refrigeration system falls outside an established acceptable range of values.

2. Discussion of the Prior Art

Refrigeration-cycle systems are used to provide cooling in everything from residential air conditioners to commercial freezers such as those employed to cool refrigerated or frozen food counters in grocery stores.

A conventional commercial refrigerator or freezer includes a condenser, an evaporator, liquid and suction lines connected between the condenser and the evaporator to form a closed coolant system, a compressor, and a thermostatic expansion valve in the liquid line adjacent the evaporator. A liquid control valve is typically provided in the liquid line and is movable between a closed, defrost-cycle position restricting the flow of liquid through the liquid line, and an open, refrigeration-cycle position.

It is a known practice to defrost a commercial refrigeration system daily, and frequently twice daily, in order to maintain the efficiency of the system and prevent the formation of ice within the counter. An electrical circuit is provided in conventional systems for controlling the defrost cycle, and includes a switch for permitting operation of the liquid control valve to switch the system between the defrost cycle and the refrigeration cycle.

In order to permit maintenance personnel to monitor the level of refrigerant in the system, it is known to provide a sight glass within the liquid line which enables the personnel to view the flow of liquid through the line. When bubbles are visible in the line, low levels of coolant are present, providing an indication that replenishment is required. However, a certain amount of coolant is typically lost from the system before bubbles ever begin to appear in the sight glass, rendering early detection of coolant lose impossible.

This shortcoming in conventional systems has become significant in recent years with the concern for protecting the ozone from depletion due to the release of freon and other coolants to the atmosphere. Within the last four years, largely due to government imposed taxes, the price of freon has increased by a factor of five, bringing to the forefront a need to conserve freon in refrigeration systems whenever possible, and to stop leaks at an early stage.

New refrigeration systems are being marketed which include complicated monitoring systems for monitoring the level of liquid refrigerant in a receiver tank of the system, and which are capable of detecting certain types of leaks in the system. However, these systems are very expensive, and do not address the need of providing a reliable monitoring apparatus capable of use in existing, older units.

As disclosed in U.S. Pat. No. 3,059,443, issued 23 Oct. 1962 to Garner, an alarm apparatus for a refrigeration system is provided for detecting low levels of refrigerant within the system. The apparatus includes a T coupling in communication with the fluid pressure line of the system, and a thermistor resistance element exposed within a gas bubble entrapment portion of the coupling. A circuit is also provided for sensing the current through the thermistor and activating an alarm when the current exceeds a value corresponding to a sensed temperature above a predetermined value.

While this conventional device provides an accurate detection of low liquid levels in a closed refrigeration system, the device will not operate when air is present in the system.

Specifically, air may be introduced into the system during initial setup thereof or during replacement of system components, and it is possible that some of this air will remain in the system even though efforts are made to remove such air by evacuating the system. This air is harmful to the system and may become trapped within the gas bubble entrapment portion of the conventional alarm device, forcing the coolant away from the thermistor and causing the alarm to sound. So long as the air remains in the system, the alarm will continue to sound in the conventional device even though sufficient refrigerant is present.

OBJECTS AND SUMMARY OF THE INVENTION

It is an object of the present invention to provide a liquid level and temperature monitoring apparatus which can be retrofit for use in an existing refrigeration system for alerting maintenance personnel that a failure of the system has occurred.

In accordance with this object, the present invention aims to provide an apparatus capable of sensing the lose of refrigerant from the system, the failure of a circulation fan or other condenser component, or the failure of the system control unit used to switch the system between a defrost cycle and a refrigeration cycle.

Another object of the present invention is to provide a monitoring apparatus capable of permitting relief or evacuation of the air from the system. Preferably, this object is achieved by providing an air removal means disposed within the chamber above the height of the line for relieving trapped air from the chamber so that the trapped air does not force the liquid level below the sensing means.

At the same time, it is an object to allow this relief of air from the chamber to take place without venting the system so that the system remains closed at all times, eliminating the possibility that coolant will inadvertently be released into the atmosphere.

In accordance with these and other objects evident from the following description of a preferred embodiment of the invention, an apparatus is provided for use in monitoring the level and temperature of a liquid flowing through a horizontally extending length of line formed by first and second line sections, wherein the temperature of the liquid is to be maintained below an established acceptable value.

The apparatus includes a chamber interposed between the first and second line sections, the chamber including a transverse cross-sectional area greater than the transverse cross-sectional area of the line. The chamber is disposed at least partially above the line and is normally closed except for an inlet and an outlet in fluid communication with the line. A sensing means is provided within the chamber above the height of the line for sensing the level and temperature of the liquid flowing through the chamber. A control means measures the liquid level and temperature sensed by the sensing means and activates the alarm when either the level of the liquid in the chamber drops below a predetermined level or the temperature exceeds a predetermined value above the established acceptable value. An air removal means is disposed within the chamber above the height of the line for relieving trapped air from the chamber so that the trapped air does not force the liquid level below the sensing means.

By constructing a monitoring apparatus in accordance with the present invention, numerous advantages are obtained. For example, by providing both a sensor and a heater within the chamber, and by controlling the predetermined sensed temperature value at which the alarm sounds, it is possible to detect low liquid levels within the line, such as those caused by the leakage of coolant from the system or by the failure of the liquid solenoid used to switch the system between defrost and refrigeration cycles.

Further, this construction provides an alarm when the temperature of the liquid in the line exceeds an acceptable value, and thus provides an indication that the condenser, or some component thereof has failed.

Also, by providing air removal means within the apparatus, it is possible to prevent air from being trapped within the chamber so that the alarm will be activated only in response to the condition of the liquid coolant and will not sound in response to trapped air in the chamber. This feature of the invention also is capable of operating without any ventilation of the system, thereby protecting against the inadvertent release of coolant from the system.

BRIEF DESCRIPTION OF THE DRAWING FIGURES

A preferred embodiment of the present invention is described in detail below with references to the attached drawing figures, wherein:

FIG. 1 is a schematic view of a refrigeration system including a monitoring apparatus constructed in accordance with a first preferred embodiment;

FIG. 2 is a circuit diagram of the monitoring apparatus, illustrating the manner in which the apparatus is electrically connected within the refrigeration system;

FIG. 3 is a fragmentary side elevational view of the monitoring apparatus, illustrating the various components thereof;

FIG. 4 is a sectional view of an in-line chamber of the apparatus, taken along 4—4 of the FIG. 3;

FIG. 5 is a sectional view of the chamber, taken along line 5—5 of FIG. 4;

FIG. 6 is a sectional view of the chamber, taken along line 6—6 of FIG. 4;

FIG. 7 is a elevational view of a rheostat dial employed in the preferred embodiments of the apparatus;

DETAILED DESCRIPTION OF THE PREFERRED EMBODIMENT

Figure 8:
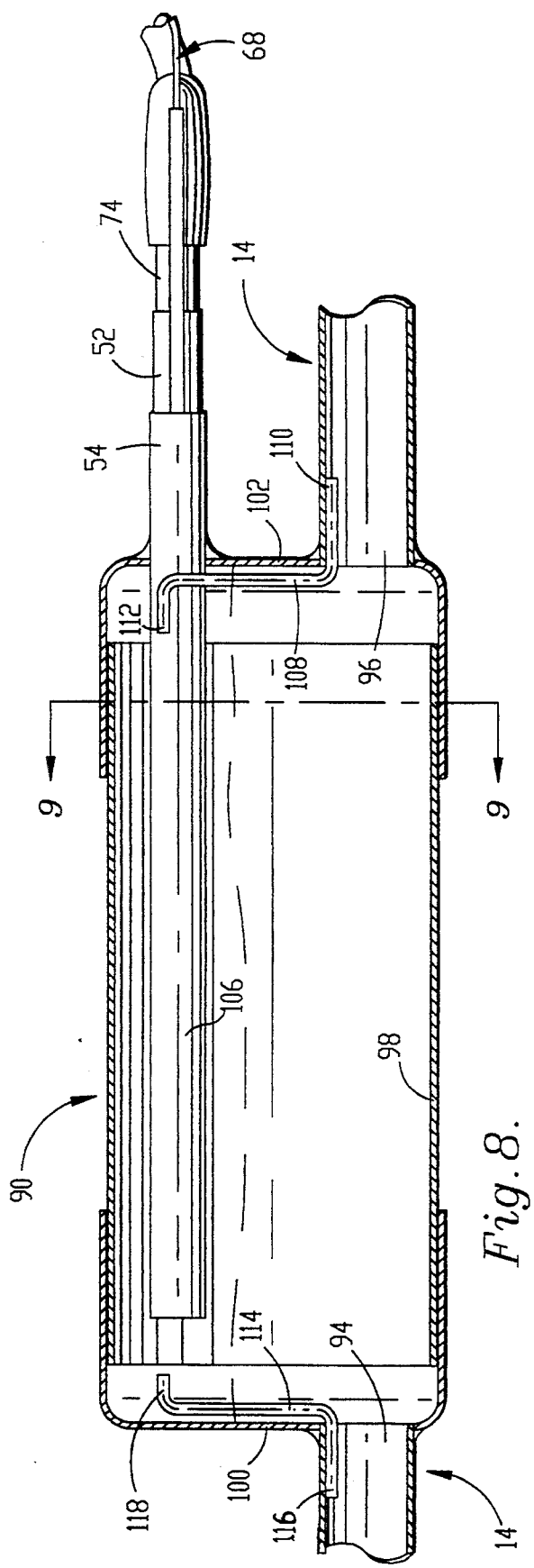
FIG. 8 is a side elevational view, taken in section, of an in-line chamber of the apparatus, constructed in accordance with a second preferred embodiment.

A refrigeration system is illustrated in FIG. 1 and includes a condenser 10, an evaporator 12, liquid and suction lines 14, 16 connected between the condenser and the evaporator, a compressor 18, and a motor 20 for driving the compressor.

The evaporator 12 is provided within a counter or freezer to be cooled, and a thermostatic expansion valve 22 is provided in the liquid line adjacent the evaporator. The suction line 16 extends from the counter or freezer to the condenser 10, which is typically positioned on the roof of the building within which the refrigeration system is disposed.

Although not shown, the condenser 10 consists of a cooling tower and a fan for drawing air through the tower to cool the refrigerant. A receiver tank 24 is commonly provided within the building close to the evaporator 12 and is connected to the liquid line 14. A return line 26 extends between the condenser 10 and the receiver tank 24 for delivering liquid refrigerant to the tank.

A liquid line solenoid valve 28 is provided in the liquid line 14, and is movable between a closed, defrost-cycle position and an open, refrigeration-cycle position, and a restrictive bypass line 30 extends around the valve for allowing a fraction of the liquid refrigerant in the receiver tank 24 to flow into the liquid line 14 during defrost.

The liquid line solenoid 28 is electrically actuated, and a circuit is provided for controlling operation of the solenoid to switch the system between the defrost and refrigeration cycles. Preferably, the refrigerant is freon, which must be maintained within the liquid line at a temperature below an established acceptable value of between 100°–200° F., and preferably below 120°–124° F.

In addition to the foregoing components, a liquid dryer 32 may also be provided within the liquid line, as may a sight glass 34 which permits maintenance personnel to visually inspect the flow of liquid coolant through the line 14.

The refrigeration system described thus far is conventional, and may either be constructed with a monitoring apparatus in accordance with the invention, or may be retrofit with such a monitoring apparatus without departing from the scope of the present invention.

The monitoring apparatus is illustrated in FIG. 3, and generally includes a chamber 36 disposed in fluid communication with a horizontally extending section of the liquid line 14, a cabinet 38 mounted in proximity to the chamber, and a remote alarm 40 positioned near an operator responsible for maintenance of the system.

The chamber 36 includes a transverse cross-sectional area greater than the transverse cross-sectional area of the liquid line 14, and a major portion of the chamber is disposed above the liquid line. The chamber also includes an inlet 42 and an outlet 44, each in fluid communication with the liquid line 14. The chamber is otherwise air-tight so as to permit air to be completely removed from the system without leaking back into the chamber.

Preferably, the chamber 36 is formed of a tubular side wall 46 having a diameter about four times greater than the diameter of the liquid line, and end walls 48, 50 secured to the side wall by welding or the like. The chamber is constructed of steel, copper or other equivalent material capable of containing the pressures commonly employed in refrigeration systems, e.g. of about 500 psi.

Turning to FIG. 6, the inlet 42 and outlet 44 are formed in opposing end plates adjacent the lower edges thereof, and the liquid line sections connected with the chamber extend into the chamber and are welded to the end plates to provide an air-tight seal between the chamber and the line 14.

As illustrated in FIG. 5, the end plate 50 includes a second hole formed above the outlet 44 for receiving a pair of elongated, tubular sleeves 52, 54. Each of these sleeves extends through the opening in the end wall into the chamber, and includes an inner closed end 56, 58 within the chamber and an outer open end 60, 62 respectively. The interior spaces within the sleeves are isolated from direct fluid contact with the chamber so that fluid within the chamber is not allowed to leak through the sleeves.

The sleeves are formed of steel, copper, or any other suitable material capable of withstanding the noted pressures of the system, and are welded to the end plate to provide an air-tight seal around the opening through which the sleeves extend.

As shown in FIG. 4, the sleeves are connected together, e.g. by welds 64 or the like, so that heat within the sleeve 52 is conducted to the larger sleeve 54. Preferably, the weld extends along the entire length of the sleeves within the chamber and is formed of a heat conductive material so that heat transfer between the sleeves is allowed.

Returning to FIG. 6, the side wall of the chamber is provided with a valve 66 on the top side thereof which permits selective fluid communication with the interior of the chamber. Preferably, the valve is a Schrader valve similar in design to valves used in automobile tires and the like, and is operable to release air that is trapped within the pressurized chamber. Because freon is of a density greater than air, the air settles on top of the freon adjacent the valve 66.

As shown in FIG. 5, a temperature sensor 68 is provided within the elongated sleeve 54 and extends into the chamber so that when the chamber is full of liquid, the temperature of the sensor is maintained at about the same temperature as the liquid. Preferably, the sensor 68 is a capillary bulb, and includes a capillary tube 70 extending between the bulb and a thermostat 72, illustrated in FIG. 2.

The thermostat 72 is of known construction and functions as a control means for measuring the temperature of the sensor and activating the alarm when the sensor temperature exceeds a predetermined value above an established acceptable value stored in the thermostat. Preferably, the thermostat 72 includes an adjustment control dial allowing adjustment of the predetermined value within a range of from about 100° F. to about 200° F. An ideal setting for the predetermined temperature value is 120°-124° F.

As shown in FIG. 5, a heater 74 is provided in the smaller sleeve 52 and extends into the interior of the chamber adjacent the temperature sensor 68. The heater is an electrical resistance heater, preferably of the pencil type, and is elongated so that heat generated within the heater is transferred to the sleeve 52 and conducted through the welds 64 and sleeve 54 to the sensor 68. By providing this construction, when the liquid within the chamber falls below the sleeves 52, 54 housing the temperature sensor 68 and heater 74, heat reaches the sensor and raises the temperature of the sensor, and when the liquid within the chamber contacts the sleeves, heat is drawn from the sleeves 52, 54 to the liquid and the temperature of the sensor is maintained at about the same value as the liquid.

Returning to FIG. 2, the heater 74 is connected to a power source 76 through a variable resister 78, e.g. a rheostat or the like, which permits adjustment of the output of the heater. Thus, a delay adjustment means is defined for varying the amount of heat generated by the heater so that the period of delay between the time at which the liquid level in the chamber falls beneath the sleeves 52, 54, and the time at which the temperature of the sensor is raised to the predetermined value may be adjusted.

Preferably, the rheostat 78 includes an on/off position, as shown in FIG. 7, and also includes a number of settings displayed in minutes, representative of the period of delay obtained at each setting.

The alarm 40 is an audible indicator, and preferably includes a bell capable of being positioned remote from the chamber. An electrical connection 80 is provided between the bell and the thermostat 72 for permitting the bell to be energized when the sensor reaches the predetermined value.

The circuit employed in the apparatus is illustrated in FIG. 2, and includes the power source 76 which may either be connected directly to the apparatus, or which may be connected through the liquid line solenoid 28 of the refrigeration system. The heater 74 and rheostat 78 receive power directly from the source and are arranged in series so that adjustment of the rheostat varies the voltage to the heater. A step-down transformer 82 is provided between the power source 76 and the thermostat 72 for reducing the voltage to the thermostat, and to the alarm 40 which is arranged in series with the thermostat.

The rheostat 78, thermostat 72 and transformer 82 are housed within the cabinet 38, shown in FIG. 3, and the cabinet preferably includes a cover movable between a closed position preventing access to these components, and an open position allowing access thereto. The cover includes a lock 86 for preventing the cabinet from being opened by unauthorized personnel. Although the cover is preferably formed of metal, any other material may be used which provides suitable protection of the enclosed components from meddling and from harmful ambient conditions.

With reference to FIG. 2, during normal operation in a refrigeration cycle, a switch 86 within the liquid line solenoid circuit is closed so that the solenoid 28 is energized and retained in an open position allowing liquid refrigerant within the receiver tank 24, shown in FIG. 3, to flow into the liquid line 14 under pressure. Closure of the switch 86 also energizes the monitoring apparatus so that heat is generated by the heater 74, as controlled by the rheostat 78, and the thermostat 72 is activated to energize the alarm 40 when the temperature of the sensor 68 exceeds the predetermined value stored by the thermostat.

As long as the liquid line 14 is fully pressurized and the system is full of refrigerant, the liquid within the chamber contacts the sleeves 52, 54, shown in FIG. 4, and draws the heat from the heater 74 before it is transferred to the sensor 68.

During defrost, the switch 86 in the liquid line solenoid circuit 88, shown in FIG. 2, is opened, causing de-energization of the solenoid valve 28 and deactivation of the monitoring apparatus. By providing this construction, it is possible to defrost the system, which can take from 30-60 minutes, without setting off the alarm. If the apparatus were not deactivated, the reduced flow through the bypass line 30, as shown in FIG. 1, would be insufficient to fill the chamber, and after the preset delay, the heater would raise the temperature of the sensor to the predetermined value and the alarm would sound.

If a leak of the refrigerant exists, the level of liquid within the chamber drops, falling beneath the sleeves 52, 54. Thereafter, heat generated by the heater is conducted through the sleeves and is allowed to radiate within the sleeve 54 so as to heat the sensor 68. Because the liquid in the chamber is not available for drawing heat away from the sleeves, heat continues to be transferred until the sensor temperature approaches that of the heater. Because the heater is maintained at a temperature greater than the predetermined value stored in the thermostat, a low liquid level will result in activation of the alarm if the low level condition continues for a sufficient length of time.

This length of time is adjustable by properly setting the rheostat 78 to control the heat generated by the heater. If voltage to the heater is reduced the delay time is increased, but if the voltage is increased, less of a delay occurs. For example, in an exemplary system, a delay of 60 minutes is experienced when 30 Volts are supplied to the heater, a delay of 30 minutes is experienced when 40 Volts are supplied to the heater, and a delay of 10 minutes is experienced when 60 Volts are supplied.

If the liquid level in the chamber drops temporarily, but rises again to a level covering the sleeves prior to activation of the alarm, heat from the sleeves is transferred again to the liquid and the alarm will not sound. Thus temporary fluctuations in the liquid level do not cause alarm unless low level condition exceeds the delay period. A delay of 30 minutes is preferred because it prevents frequent "false" alarms that would be caused by normal system fluctuations, but still detects a leak before a significant amount of refrigerant is lost.

If there is a cooling tower failure, such as a busted fan or the like, and the liquid delivered to the receiver tank 24 is not properly cooled, the liquid level within the chamber 36, although maybe continuing to contact the sleeves 52, 54, will be of a temperature higher than normal. If this temperature exceeds the predetermined value stored in the thermostat, heat from the liquid will raise the temperature of the sensor, causing activation of the alarm.

If air gets into the system, which is normally evacuated, the chamber provides a trap from which the air can not escape. As mentioned, because the air is lighter than the refrigerant, it is trapped adjacent the valve 66 on the upper surface of the chamber and forces the liquid level downward. If sufficient air is trapped in the chamber, the sleeves are uncovered allowing the heater to raise the temperature of the sensor to the predetermined value, causing the alarm to sound.

In addition to providing an alarm in each of the foregoing circumstances, the monitoring apparatus will also sound when any of a number of additional problems arise which have the effect of either reducing the pressure in the liquid line or of raising the temperature of the refrigerant in the liquid line. Thus, maintenance personnel alerted by the alarm are able to diagnosis the problem causing the alarm by systematically checking the various conditions capable of causing these conditions within the chamber.

Figure 9:
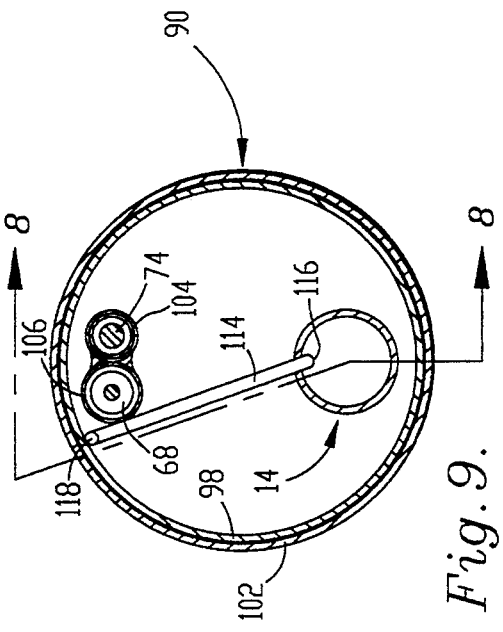
FIG. 9 is a sectional view of the chamber taken along line 9—9 of FIG. 8.

A modified chamber 90 constructed in accordance with a second preferred embodiment of the present invention is shown in FIGS. 8 and 9. With reference first to FIG. 8, the chamber includes a transverse cross-sectional area greater than the transverse cross-sectional area of the liquid line 14, and a major portion of the chamber is disposed above the liquid line. The chamber also includes an inlet 94 and an outlet 96, each in fluid communication with the liquid line. The chamber is otherwise air-tight so as to permit air to be completely removed from the system without leaking back into the chamber.

Preferably, the chamber is formed of a tubular side wall 98 having a diameter about four times greater than the diameter of the liquid line, and end walls 100, 102 secured to the side wall by welding or the like. The chamber is constructed of steel, copper or other equivalent material capable of containing the pressures commonly employed in refrigeration systems, e.g. of about 500 psi.

The inlet 94 and outlet 96 are formed in opposing end walls 100, 102 adjacent the lower edges thereof, and the liquid line sections connected with the chamber are welded to the end walls to provide an air-tight seal between the chamber and the line.

The end wall 102 includes a second hole formed above the outlet for receiving a pair of sleeves 104, 106 identical to sleeves 52, 54 described above. Each of these sleeves extends through the opening in the end wall 102 into the chamber, and includes an inner closed end within the chamber and an outer open end. The interior spaces within the sleeves are isolated from direct fluid contact with the chamber so that fluid within the chamber is not allowed to leak through the sleeves.

The sleeves 104, 106 receive the heater 74 and temperature sensor 68 as in the embodiment described above, and these components define a sensing means provided within the chamber above the height of the line for sensing the level and temperature of the liquid flowing through the chamber.

A control means substantially identical that described above with reference to the first preferred embodiment is employed with the chamber of the second preferred embodiment, and defines a means for measuring the liquid level and temperature sensed by the sensing means and for activating the alarm when either the level of the liquid in the chamber drops below a predetermined level or the temperature exceeds a predetermined value above the established acceptable value.

It is noted that substitutions may be made and equivalents employed herein for the heater, temperature sensor and control means described, and these components may be replaced by solid state components such as a thermistor and an associated circuit, as described in U.S. Pat. No. 3,059,443, discussed above.

As with the first preferred construction of the chamber, the second preferred embodiment includes an air removal means disposed within the chamber above the height of the line for relieving trapped air from the chamber so that the trapped air does not force the liquid level below the sensing means. In the second embodiment, the valve is removed from the chamber so that venting of the chamber is not possible, and a separate air removal means is provided within the chamber.

The air removal means includes a capillary tube 108 having opposed lower and upper ends 110, 112. The lower end 110 is disposed within the outlet and extends into the line in the direction of fluid flow so that a negative pressure is exerted at the first end. Preferably, the second end is positioned adjacent the upper internal surface of the line extending from the outlet so that a suction is applied to the capillary tube only when the line is full of liquid.

The upper end 112 of the capillary tube 108 is disposed within the chamber at a height at least equal to the height of the sensing means so that air adjacent the sensing means is drawn through the tube from the chamber and introduced back into the liquid when vacuum is applied to the tube by liquid in the line 14.

Preferably, a second capillary tube 114 is provided opposite the first capillary tube 108 within the chamber 90. The second capillary tube is Substantially identical in construction to the first tube, including a lower end 116 disposed within the inlet and extending into the line 14 in a direction opposite to the direction of fluid flow through the line, and an upper end 118 disposed within the chamber at a height at least equal to the height of the sensing means.

The tubes 108, 114 are formed of any suitable material such as steel, copper or the like, and preferably includes an inner diameter of about 0.02 inches and an external diameter of about ⅛ inches. During use, the capillary tube position in the outlet of the chamber provides the air removal function and the tube positioned in the inlet simply introduces a small spray of liquid into the chamber which tends to move any air in the chamber toward the outlet.

The primary benefit in providing two capillary tubes in the chamber resides in the ability to reverse the orientation of such a construction within the line without adversely effecting operation of the apparatus. Thus, when the chamber is oriented as shown in FIG. 8, the apparatus works just as well as if the chamber were reversed relative to the line so that the inlet functions as an outlet.

During use of the second preferred embodiment, monitoring of the system is identical to the first preferred embodiment described above. However, if air is present in the system, the air is trapped within the chamber 90 and accumulates until the air forces the coolant beneath the upper end of the capillary tube 108. Once the air reaches the capillary tube, it is drawn through the tube from the chamber as a result of the negative pressure created at the lower end of the tube by the liquid flowing past the tube through the outlet.

If a low level of coolant is present, the level of liquid in the line 14 drops beneath the lower end 110 of the capillary tube 108, and the liquid level in the chamber drops beneath the sensing means. Because no pressure drop is experienced at the bottom end of the tube, nothing is drawn through the tube and it sits idle without effecting the sensing of a low-liquid level within the system.

By providing the capillary tube 108 at the outlet of the chamber, it is possible to remove air from the chamber without requiring that the chamber be vented as is the case with the first preferred embodiment. Although venting may be preferred in some applications of the present invention, there also may exist situations where such venting is not only unnecessary but undesirable. In these cases, the second preferred embodiment provides a suitable solution without allowing air in the system to interfere with the accurate monitoring of liquid level and temperature conditions.

Although the invention has been described with reference to the preferred embodiment illustrated in the attached drawing figures, it is noted that substitutions may be made and equivalents employed herein without departing from the scope of the invention as recited in the claims.

What is claimed is:

1. An apparatus for use in monitoring the level and temperature of a liquid flowing through a horizontally extending line formed by first and second line sections, wherein the line is to remain full of liquid and the temperature of the liquid is to be maintained below an established acceptable value, the liquid level and temperature monitoring apparatus comprising:
   a chamber interposed between the first and second line sections and including a transverse cross-sectional area greater than the transverse cross-sectional area of the liquid line, the chamber being disposed at least partially above the line and being normally closed except for an inlet in fluid communication with the first line section and an outlet in fluid communication with the second line section;
   a sensing means provided within the chamber above the height of the line for sensing the level and temperature of the liquid flowing through the chamber;
   an alarm;
   a control means connected between the sensing means and the alarm for measuring the liquid level and temperature sensed by the sensing means and for activating the alarm when either the level of the liquid in the chamber drops below a predetermined level or the temperature exceeds a predetermined value above the established acceptable value; and
   an air removal means disposed within the chamber above the height of the line for relieving trapped air from the chamber so that the trapped air does not force the liquid level below the sensing means, the air removal means including a capillary tube having opposed first and second ends, wherein the first end is disposed within the outlet and extends into the line in the direction of fluid flow so that a negative pressure is exerted at the first end, and the second end is disposed within the chamber at a height at least equal to the height of the sensing means so that air adjacent the sensing means is drawn through the tube from the chamber and introduced back into the liquid.

2. The apparatus as recited in claim 1, further comprising a second capillary tube opposite the first capillary tube within the chamber, the second capillary tube including opposed first and second ends, wherein the first end of the second tube is disposed within the inlet and extends into the line in the direction opposite to the direction of fluid flow, and the second end is disposed within the chamber at a height at least equal to the height of the sensing means.

3. The apparatus as recited in claim 1, wherein the capillary tube includes an inside diameter of about 0.020 inches.

4. An apparatus for use in monitoring the level and temperature of a liquid flowing through a horizontally extending line formed by first and second line sections, wherein the temperature of the liquid is to be maintained below an established acceptable value, the liquid level and temperature monitoring apparatus comprising:

a chamber interposed between the first and second line sections and including a transverse cross-sectional area greater than the transverse cross-sectional area of the liquid line, the chamber being disposed at least partially above the line and being normally closed except for an inlet in fluid communication with the first line section and an outlet in fluid communication with the second line section;

a temperature sensor provided within the chamber above the height of the line;

an alarm;

a control means connected between the temperature sensor and the alarm for measuring the temperature of the sensor and activating the alarm when the sensor temperature exceeds a predetermined value above the established acceptable value;

a heater provided within the chamber adjacent the temperature sensor above the height of the line, the heater being of a temperature greater than the predetermined value so that when the liquid within the chamber falls below the temperature sensor and heater, heat is transferred to the sensor and raises the temperature of the sensor, and when the liquid level within the chamber reaches the sensor and heater, heat is transferred to the liquid and the temperature of the sensor is maintained at about the same value as the liquid; and an air removal means disposed within the chamber above the height of the line for relieving trapped air from the chamber so that the trapped air does not force the liquid level below the temperature sensor, the air removal means including a capillary tube having opposed first and second ends, wherein the first end is disposed within the outlet and extends into the line in the direction of fluid flow so that a negative pressure is exerted at the first end, and the second end is disposed within the chamber at a height at least equal to the height of the sensing means so that air adjacent the sensing means is drawn through the tube from the chamber and introduced back into the liquid.

* * * * *